US011067404B2

(12) United States Patent
Tennent et al.

(10) Patent No.: US 11,067,404 B2
(45) Date of Patent: Jul. 20, 2021

(54) VEHICLE USAGE-BASED PRICING ALERTS

(71) Applicant: HERE Global B.V., Eindhoven (NL)

(72) Inventors: Toby Tennent, Chicago, IL (US);
George Filley, Deer Park, IL (US);
Anatoly Belkin, Glenview, IL (US);
Charles Smolich, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 308 days.

(21) Appl. No.: 16/023,204

(22) Filed: Jun. 29, 2018

(65) Prior Publication Data

US 2018/0321051 A1    Nov. 8, 2018

Related U.S. Application Data

(63) Continuation of application No. 15/182,776, filed on Jun. 15, 2016, now Pat. No. 10,036,645.

(51) Int. Cl.
*G01C 21/34* (2006.01)
*H04L 29/08* (2006.01)
(Continued)

(52) U.S. Cl.
CPC ..... *G01C 21/3484* (2013.01); *G01C 21/3453* (2013.01); *G01C 21/3492* (2013.01);
(Continued)

(58) Field of Classification Search
CPC ............ G01C 21/3484; G01C 21/3453; G01C 21/3492; G01C 21/3691; G01C 21/3697; H04L 67/12; H04L 67/18; G06Q 50/30
See application file for complete search history.

(56) References Cited

U.S. PATENT DOCUMENTS 6,868,386 B1    3/2005  Henderson et al.
8,930,231 B2    1/2015  Bowne et al.
(Continued)

FOREIGN PATENT DOCUMENTS

GB    2450079 A    12/2008

OTHER PUBLICATIONS

International Searching Authority, International Search Report and Written Opinion for International Application No. PCT/EP2017/064583, dated Jan. 30, 2018, 26 pages, European Patent Office, Netherlands.
(Continued)

*Primary Examiner* — Michael V Kerrigan
(74) *Attorney, Agent, or Firm* — Alston & Bird LLP

(57) ABSTRACT

Methods, apparatus, computer program products, and systems for presenting a trip cost determination and/or a representation thereof to a user. An example method comprises receiving a pricing request comprising a user location and determining one or more cost model parameters, the one or more cost model parameters comprising at least one of current real-world conditions, predicted real-world conditions, user behavior characteristics, vehicle characteristics, and roadway information. The example method further comprises providing cost model information comprising at least one of (a) one or more cost model parameters, (b) a route, and (c) the user location and receiving a trip cost determination. The trip cost determination is determined based at least in part on the cost model information. The example method further comprises providing the trip cost determination and causing presentation of a representation of the trip cost determination through a user interface of a user apparatus.

20 Claims, 8 Drawing Sheets

(51) Int. Cl.
  *G01C 21/36* (2006.01)
  *G06Q 50/30* (2012.01)

(52) U.S. Cl.
  CPC ..... *G01C 21/3691* (2013.01); *G01C 21/3697* (2013.01); *G06Q 50/30* (2013.01); *H04L 67/12* (2013.01); *H04L 67/18* (2013.01)

(56) References Cited

U.S. PATENT DOCUMENTS

| | | |
|---|---|---|
| 8,996,312 B1 | 3/2015 | Freund et al. |
| 10,036,645 B2 | 7/2018 | Tennent et al. |
| 2010/0131300 A1 | 5/2010 | Collopy et al. |
| 2010/0131304 A1 | 5/2010 | Collopy et al. |
| 2011/0106370 A1 | 5/2011 | Duddle et al. |
| 2012/0179493 A1 | 7/2012 | Giordano |
| 2013/0261960 A1 | 10/2013 | Wu et al. |
| 2014/0058761 A1 | 2/2014 | Freiberger et al. |
| 2015/0292897 A1 | 10/2015 | Aldereguia et al. |
| 2017/0140468 A1* | 5/2017 | Peak ............... G01C 21/36 |
| 2017/0193627 A1* | 7/2017 | Urmson ............ G06Q 50/30 |

OTHER PUBLICATIONS

Bruce, Chris, "Subaru Pairs with Liberty Mutual for Built-in Driving Monitor App", *Autoblog*, Jan. 4, 2016, retrieved from <http://www.autoblog.com/2016/01/04/subaru-liberty-mutual-driving-monitor-app/> on Dec. 14, 2016, 7 pages.

HERE and Swiss Re, "The Future of Motor Insurance: How car connectivity and ADAS are impacting the market, A Joint whitepaper by HERE and Swiss Re", May 3, 2016, HERE and Swiss Re, Germany.

United States Patent and Trademark Office, Office Action for U.S. Appl. No. 15/182,776, dated Sep. 13, 2017, U.S.A.

United States Patent and Trademark Office, Notice of Allowance for U.S. Appl. No. 15/182,776, dated Mar. 29, 2018, U.S.A.

\* cited by examiner

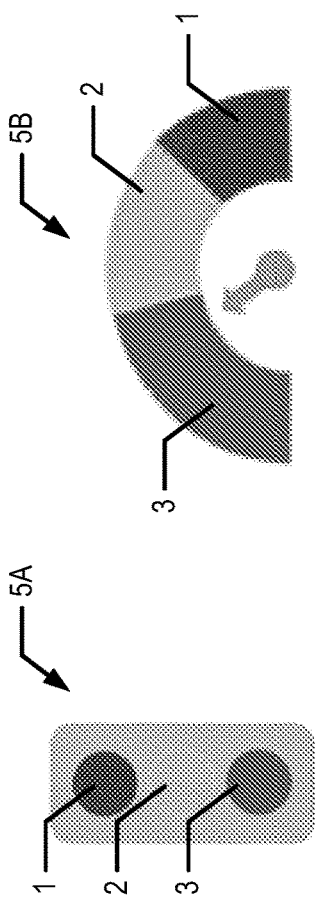
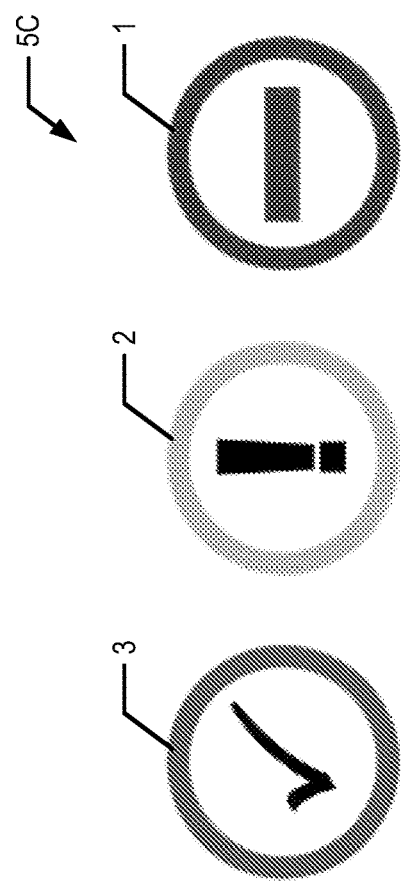
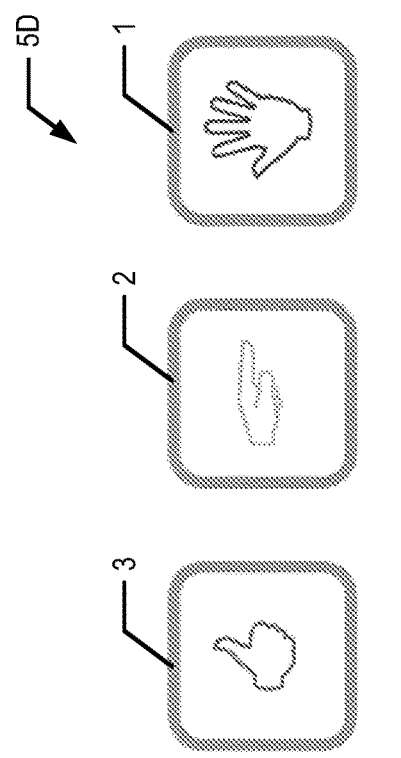
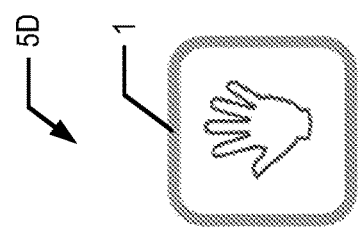
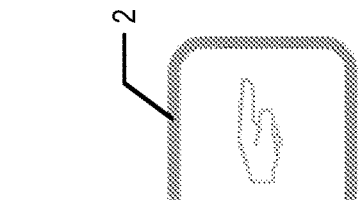
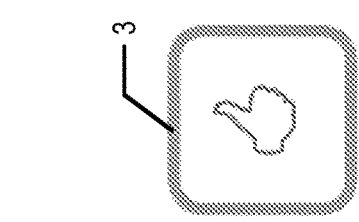
FIG. 5A
FIG. 5B
FIG. 5C
FIG. 5D

VEHICLE USAGE-BASED PRICING ALERTS

CROSS-REFERENCE TO RELATED APPLICATIONS

This application is a continuation of U.S. application Ser. No. 15/182,776, filed Jun. 15, 2016, the content of which is hereby incorporated herein by reference.

TECHNICAL FIELD

Example embodiments relate generally to usage-based costs for operating a vehicle. In particular, example embodiments generally relate to determining cost model parameters for determining a usage-based cost for a trip and providing a user with an indication of the usage-based cost for the trip.

BACKGROUND

High occupancy toll lanes are toll lanes for which the toll price dynamically varies based on current traffic conditions. For example, Atlanta, Ga.; Seattle, Wash.; Minneapolis, Minn.; Denver, Colo.; and other metropolitan areas currently have operating high occupancy toll lanes. However, a user planning a trip or beginning a trip may not be informed of the cost of using a high occupancy toll lane until the user reaches the entrance to the high occupancy toll lane. In various scenarios, if the user had known the cost of using the high occupancy toll lane at the outset of a trip, the user may have delayed the trip, taken a different route, and/or the like. Thus, it may be helpful to users to be able to determine a usage-based cost for a trip at the beginning of a trip.

BRIEF SUMMARY

Example embodiments are configured to proactively determine vehicle usage-based costs for a trip and provide the cost and/or a representation thereof to a user. For example, various embodiments may relate to vehicle usage-based taxes, roadway usage fees, dynamically varying tolls, usage-based vehicle insurance, usage-based vehicle rental/share fees, and/or the like. In example embodiments, information regarding (a) the vehicle, (b) the user (e.g., operator of the vehicle), (c) the trip (e.g., a route, current user location, etc.), (d) roadways to be traveled during the trip, (e) current and/or predicted real-world conditions, and/or the like may be determined and provide to a marketplace system. The marketplace system may apply one or more pricing models associated with one or more providers and return a trip cost determination. The trip cost determination may be provided to a user apparatus. The user apparatus may then determine a representation of the trip cost determination to be presented to the user through a user interface of the user apparatus and present the representation of the trip cost to the user. In example embodiments, an updated or modified trip cost may be determined and provided to the user if the trip ends up deviating significantly from the predicted trip.

Methods, apparatus, and computer program products are provided in accordance with an example embodiment in order to present a trip cost determination and/or a representation thereof to a user. In example embodiments, a pricing request comprising a user location is received. One or more cost model parameters are determined. The one or more cost model parameters comprise at least one of current real-world conditions, predicted real-world conditions, user behavior characteristics, vehicle characteristics, and roadway information. Cost model information is provided. For example, the cost model information comprises at least one of (a) one or more cost model parameters, (b) a route, and (c) the user location. A trip cost determination determined based at least in part on the cost model information is received. The trip cost determination is provided and presentation of a representation of the trip cost determination through a user interface of a user apparatus is caused.

In accordance with an example embodiment, a method is provided. The method comprises receiving a pricing request comprising a user location. The method further comprises determining one or more cost model parameters, the one or more cost model parameters comprising at least one of current real-world conditions, predicted real-world conditions, user behavior characteristics, vehicle characteristics, and roadway information and providing cost model information comprising at least one of (a) one or more cost model parameters, (b) a route, and (c) the user location. The method further comprises receiving a trip cost determination. The trip cost determination is determined based at least in part on the cost model information. The method further comprises providing the trip cost determination and causing presentation of a representation of the trip cost determination through a user interface of a user apparatus.

In an example embodiment, the current real-world conditions comprise at least one of current weather conditions, current traffic conditions, or current driving conditions in the vicinity of the user location. In an example embodiment, the predicted real-world conditions comprise at least one of predicted weather conditions, predicted traffic conditions, or predicted driving conditions at one or more locations along the route. In an example embodiment, the user behavior characteristics comprise a driver score or driver classification for a user associated with the request. In an example embodiment, the vehicle characteristics comprise vehicle handling information for a particular vehicle, a vehicle type, or a vehicle classification associated with the request. In an example embodiment the roadway information comprises map information for one or more roads corresponding to the user location, the route, or both. In an example embodiment, the route comprises a navigation path for driving from an origin location to a destination location. In an example embodiment the user location is the current location of the user as determined by a location sensor of the user apparatus. In an example embodiment the trip cost determination comprises a cost for a trip associated with the user location and wherein the cost is incurred for roadway usage taxes or fees, tolls, usage-based vehicle insurance, vehicle rental fees, or vehicle share fees. In an example embodiment presenting the representation of the trip cost determination through the user interface comprises determining the representation of the trip cost determination based on stored user preferences.

In an example embodiment, the method further comprises receiving a modified trip request. The modified trip request comprises a modified route, modified timing information, a modified vehicle identifier, or a combination thereof. The method further comprises (a) determining one or more modified cost model parameters based at least in part on the modified trip request, (b) providing at least one of the one or more modified cost model parameters, (c) receiving a modified trip cost determination, and (d) providing the modified trip cost determination. In an example embodiment, the method further comprises, when it is determined that a modified representation of the modified trip cost determination is different than the representation of the trip cost determination, causing presentation of the modified representation of the trip cost determination through the user interface of the user apparatus.

In accordance with an example embodiment, an apparatus is provided. In an example embodiment, the apparatus comprises at least one processor and at least one memory storing computer program code. The at least one memory and the computer program code configured to, with the processor, cause the apparatus to at least receive a pricing request comprising a user location and determine one or more cost model parameters. The one or more cost model parameters comprise at least one of current real-world conditions, predicted real-world conditions, user behavior characteristics, vehicle characteristics, and roadway information. The at least one memory and the computer program code are further configured to, with the processor, cause the apparatus to at least provide cost model information comprising at least one of (a) one or more cost model parameters, (b) a route, and (c) the user location and receive a trip cost determination. The trip cost determination is determined based at least in part on the cost model information. The at least one memory and the computer program code are further configured to, with the processor, cause the apparatus to at least provide the trip cost determination and cause presentation of a representation of the trip cost determination through a user interface of a user apparatus.

In an example embodiment, the current real-world conditions comprise at least one of current weather conditions, current traffic conditions, or current driving conditions in the vicinity of the user location. In an example embodiment, the predicted real-world conditions comprise at least one of predicted weather conditions, predicted traffic conditions, or predicted driving conditions at one or more locations along the route. In an example embodiment, the user behavior characteristics comprise a driver score or driver classification for a user associated with the request. In an example embodiment, the vehicle characteristics comprise vehicle handling information for a particular vehicle, a vehicle type, or a vehicle classification associated with the request. In an example embodiment the roadway information comprises map information for one or more roads corresponding to the user location, the route, or both. In an example embodiment, the route comprises a navigation path for driving from an origin location to a destination location. In an example embodiment the user location is the current location of the user as determined by a location sensor of the user apparatus. In an example embodiment the trip cost determination comprises a cost for a trip associated with the user location and wherein the cost is incurred for roadway usage taxes or fees, tolls, usage-based vehicle insurance, vehicle rental fees, or vehicle share fees. In an example embodiment presenting the representation of the trip cost determination through the user interface comprises determining the representation of the trip cost determination based on stored user preferences.

In an example embodiment, the at least one memory and the computer program code are further configured to, with the processor, cause the apparatus to at least receive a modified trip request. The modified trip request comprises a modified route, modified timing information, a modified vehicle identifier, or a combination thereof. The at least one memory and the computer program code are further configured to, with the processor, cause the apparatus to at least (a) determine one or more modified cost model parameters based at least in part on the modified trip request, (b) provide at least one of the one or more modified cost model parameters, (c) receive a modified trip cost determination, and (d) provide the modified trip cost determination. In an example embodiment, the at least one memory and the computer program code are further configured to, with the processor, cause the apparatus to at least, when it is determined that a modified representation of the modified trip cost determination is different than the representation of the trip cost determination, cause presentation of the modified representation of the trip cost determination through the user interface of the user apparatus.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to receive a pricing request comprising a user location and determine one or more cost model parameters. The one or more cost model parameters comprise at least one of current real-world conditions, predicted real-world conditions, user behavior characteristics, vehicle characteristics, and roadway information. The computer-executable program code instructions further comprise program code instructions configured to provide cost model information comprising at least one of (a) one or more cost model parameters, (b) a route, and (c) the user location and receive a trip cost determination. The trip cost determination is determined based at least in part on the cost model information. The computer-executable program code instructions further comprise program code instructions configured to provide the trip cost determination and cause presentation of a representation of the trip cost determination through a user interface of a user apparatus.

In an example embodiment, the current real-world conditions comprise at least one of current weather conditions, current traffic conditions, or current driving conditions in the vicinity of the user location. In an example embodiment, the predicted real-world conditions comprise at least one of predicted weather conditions, predicted traffic conditions, or predicted driving conditions at one or more locations along the route. In an example embodiment, the user behavior characteristics comprise a driver score or driver classification for a user associated with the request. In an example embodiment, the vehicle characteristics comprise vehicle handling information for a particular vehicle, a vehicle type, or a vehicle classification associated with the request. In an example embodiment the roadway information comprises map information for one or more roads corresponding to the user location, the route, or both. In an example embodiment, the route comprises a navigation path for driving from an origin location to a destination location. In an example embodiment the user location is the current location of the user as determined by a location sensor of the user apparatus. In an example embodiment the trip cost determination comprises a cost for a trip associated with the user location and wherein the cost is incurred for roadway usage taxes or fees, tolls, usage-based vehicle insurance, vehicle rental fees, or vehicle share fees. In an example embodiment presenting the representation of the trip cost determination through the user interface comprises determining the representation of the trip cost determination based on stored user preferences.

In an example embodiment, the computer-executable program code instructions further comprise program code instructions configured to receive a modified trip request. The modified trip request comprises a modified route, modified timing information, a modified vehicle identifier, or a combination thereof. The computer-executable program code instructions further comprise program code instructions configured to (a) determine one or more modified cost model parameters based at least in part on the modified trip request, (b) provide at least one of the one or more modified cost model parameters, (c) receive a modified trip cost determination, and (d) provide the modified trip cost determination. In an example embodiment, The computer-executable program code instructions further comprise program code instructions configured to, when it is determined that a modified representation of the modified trip cost determination is different than the representation of the trip cost determination, cause presentation of the modified representation of the trip cost determination through the user interface of the user apparatus.

In accordance with yet another example embodiment of the present invention, an apparatus is provided. The apparatus comprises means for receiving a pricing request comprising a user location. The apparatus further comprises means for determining one or more cost model parameters. The one or more cost model parameters comprise at least one of current real-world conditions, predicted real-world conditions, user behavior characteristics, vehicle characteristics, and roadway information. The apparatus further comprises means for providing cost model information comprising at least one of (a) one or more cost model parameters, (b) a route, and (c) the user. The apparatus further comprises means for receiving a trip cost determination. The trip cost determination is determined based at least in part on the cost model information. Additionally, the apparatus comprises means for providing the trip cost determination and causing presentation of a representation of the trip cost determination through a user interface of a user apparatus.

BRIEF DESCRIPTION OF THE DRAWINGS

Figure 1:
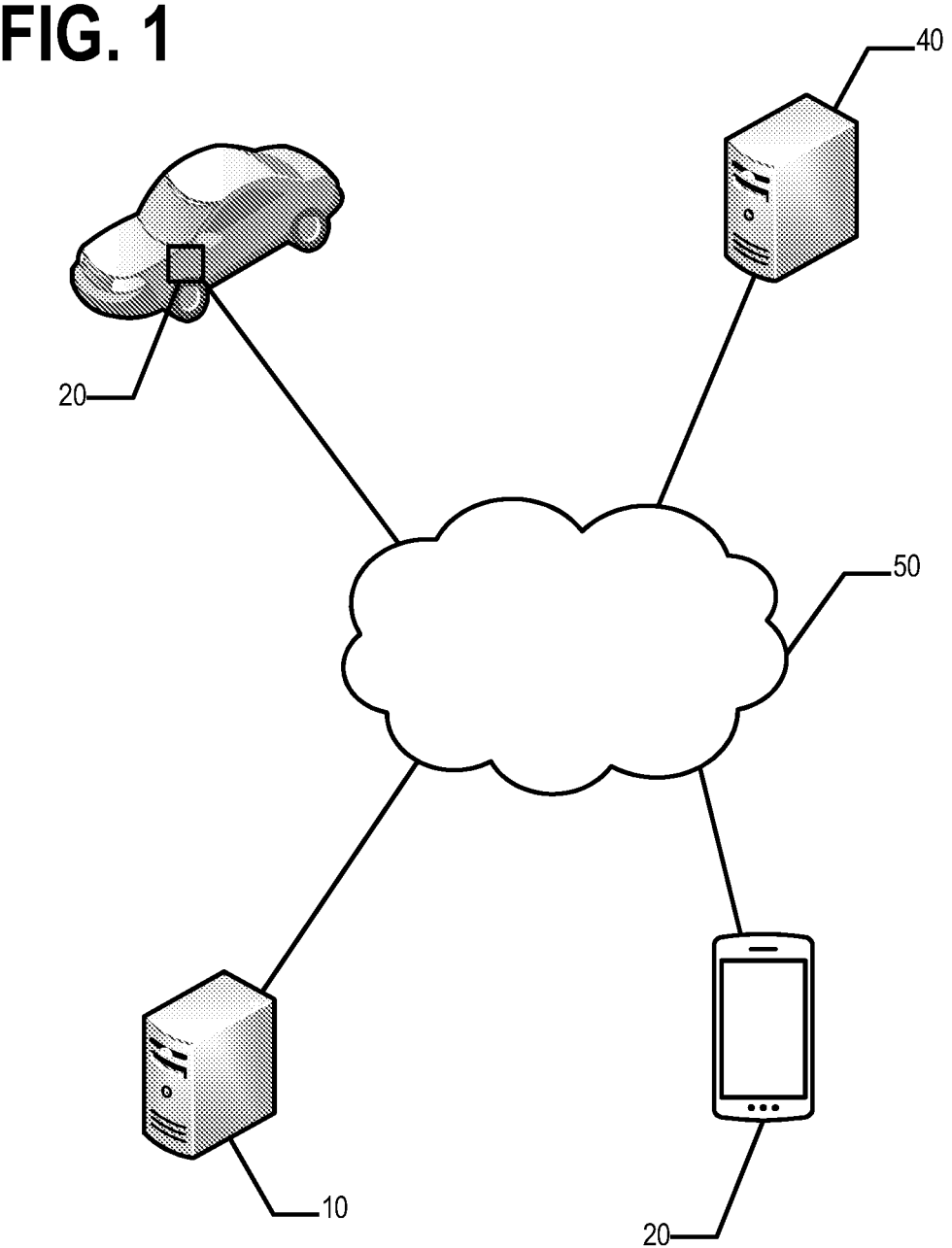
Figure 2:
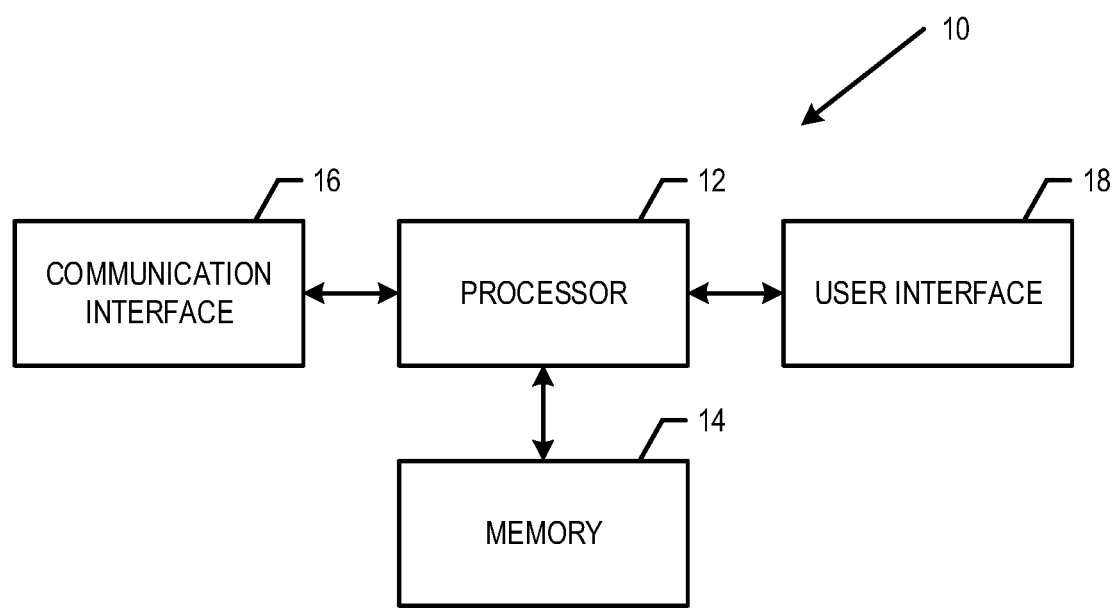
Figure 3:
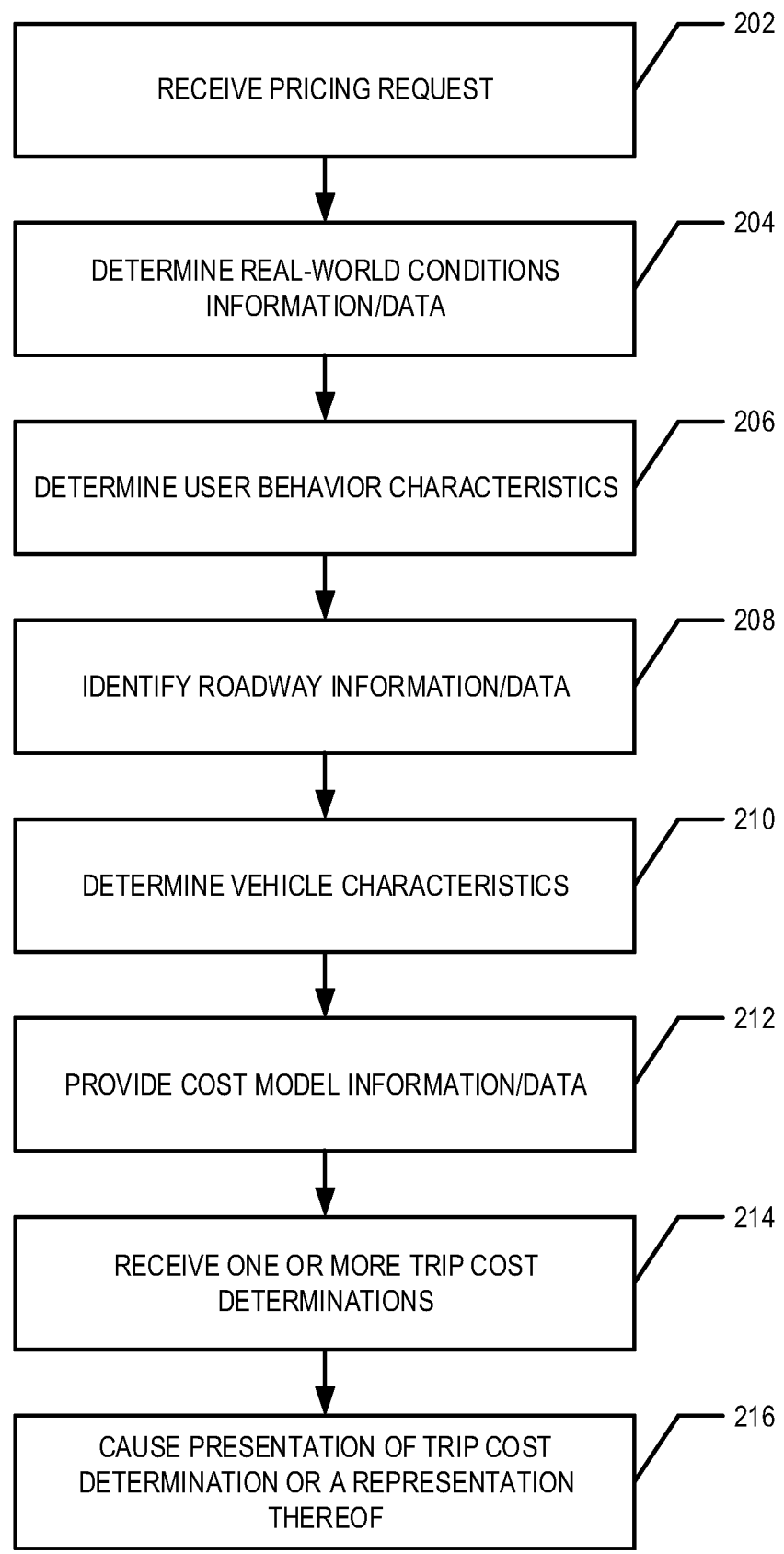
Figure 4:
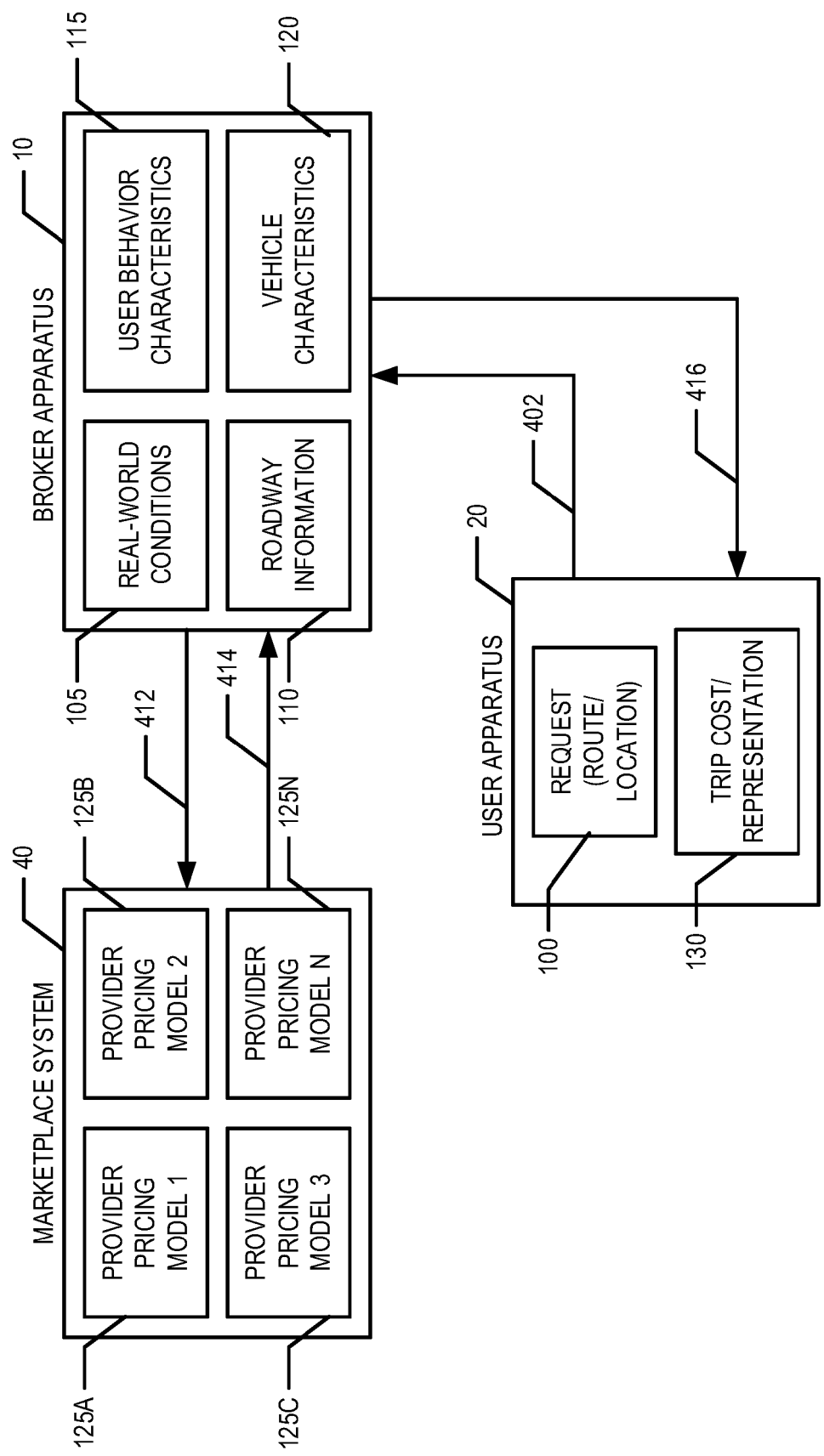
Figure 4A:
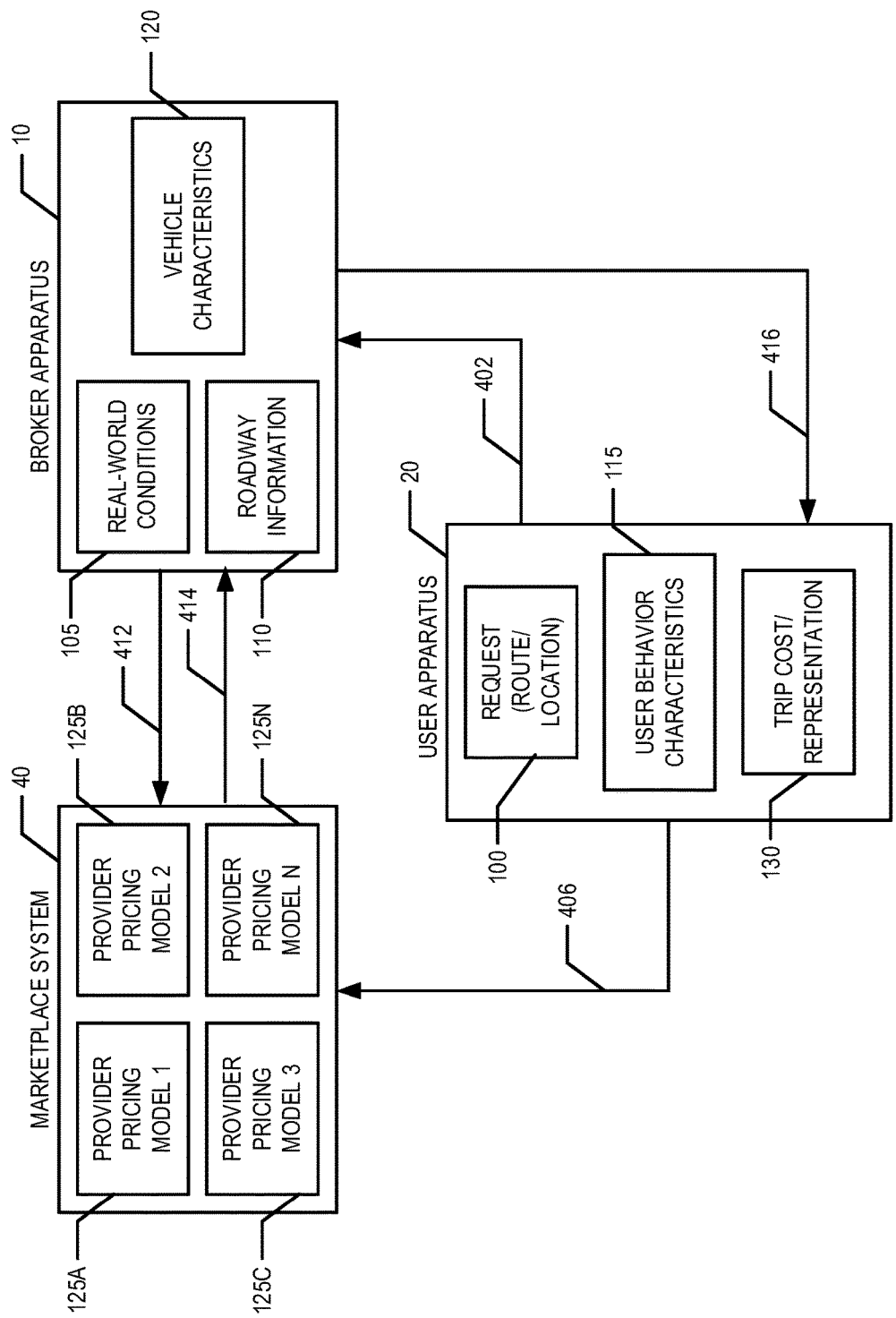
Figure 5E:
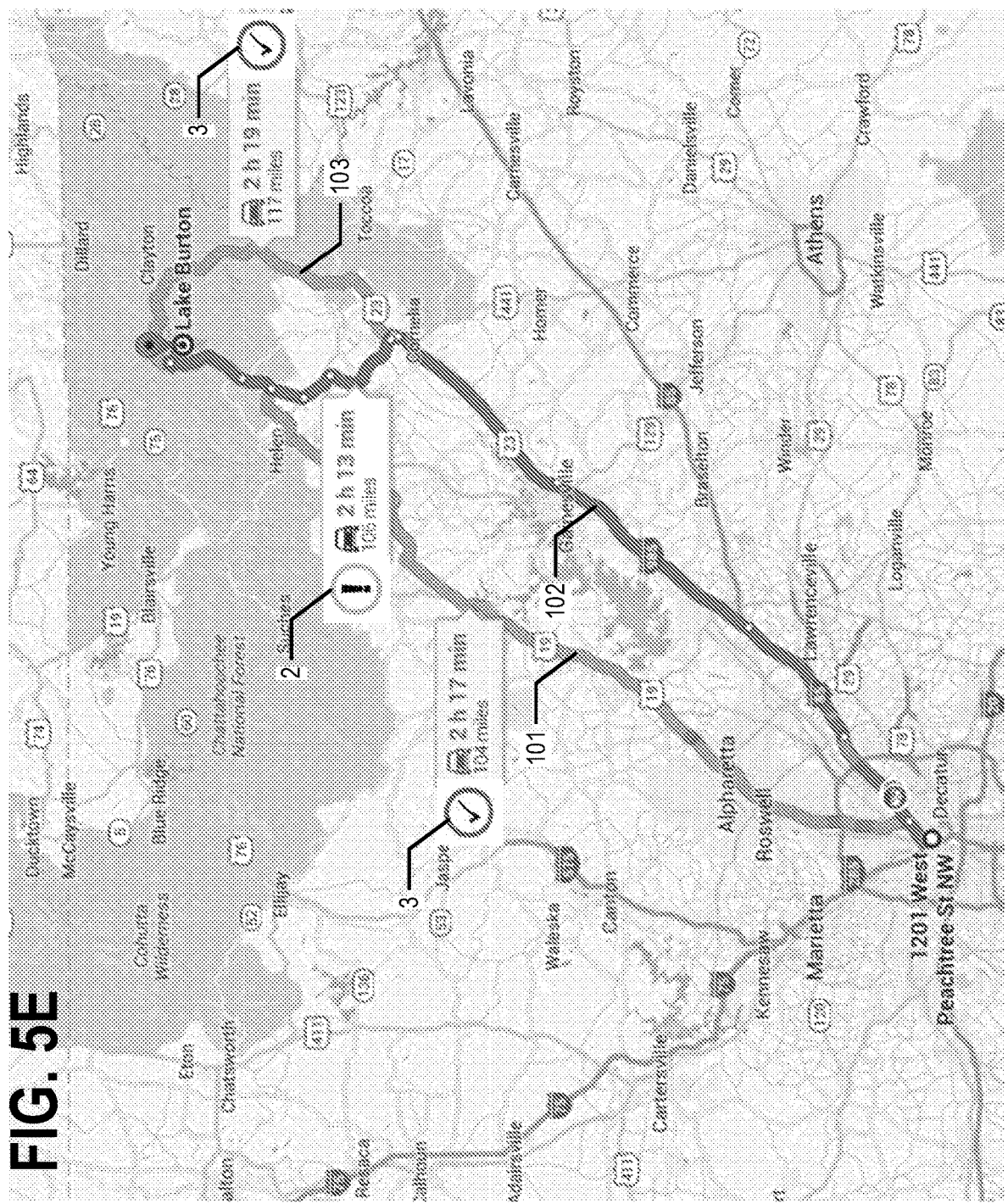
Figure 6:
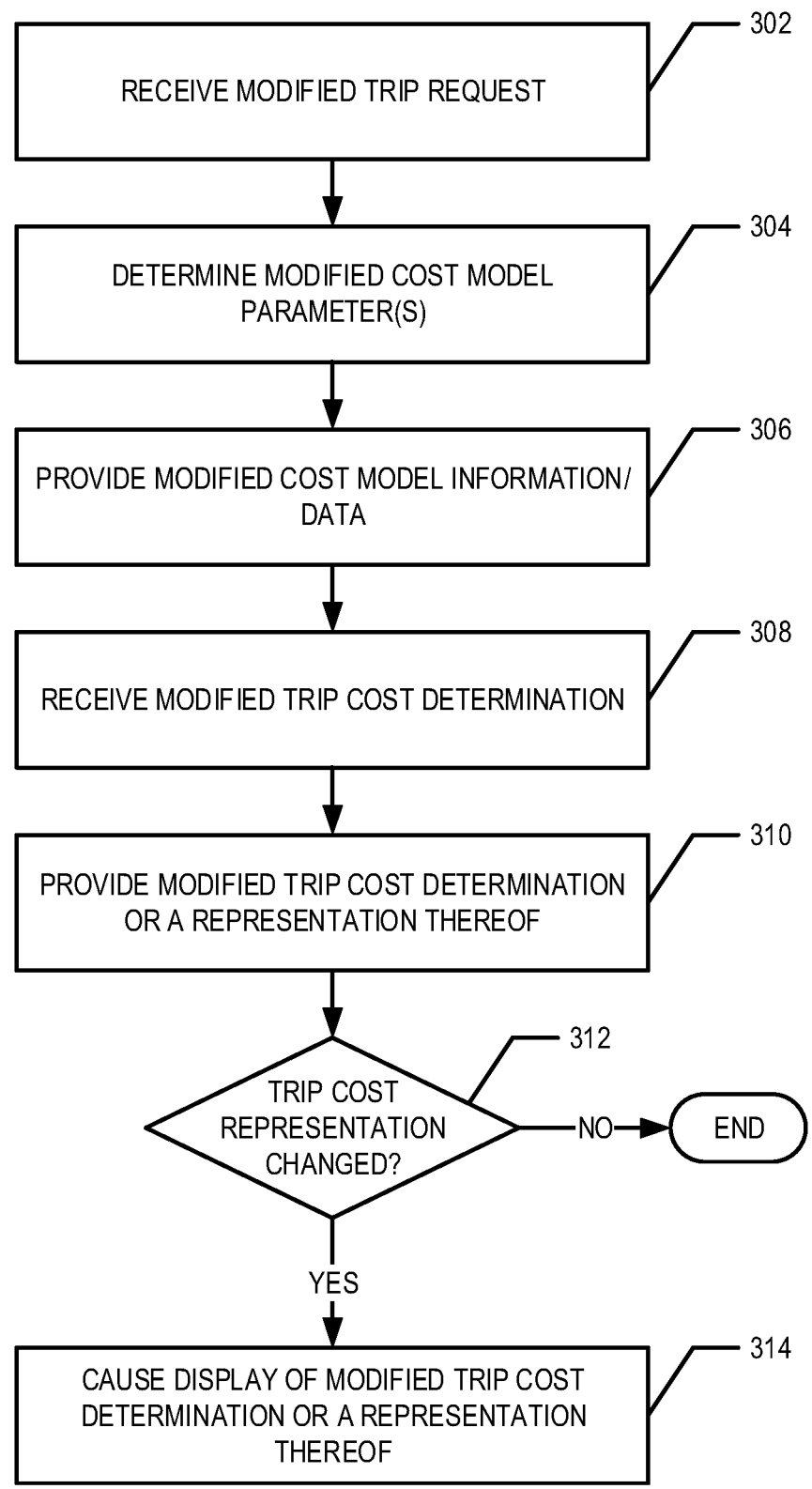

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2 is a block diagram of a broker apparatus that may be specifically configured in accordance with an example embodiment;

FIG. 3 is a flowchart illustrating operations performed, such as by the broker apparatus of FIG. 2, in order to provide a trip cost representation to a user, in accordance with an example embodiment;

FIG. 4 shows a schematic diagram of the information flow for presenting a representation of a trip cost to a user, in accordance with an example embodiment;

FIG. 4A shows a schematic diagram of an alternative information flow for presenting a representation of a trip cost to a user, in accordance with an example embodiment;

FIGS. 5A, 5B, 5C, 5D, and 5E each illustrate example representations of a trip cost, in accordance with an example embodiment; and FIG. 6 is a flowchart illustrating operations performed, such as by the broker apparatus of FIG. 2, in order to provide a user with a representation of a trip cost for a modified trip.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide vehicle usage-based pricing and to provide proactive and timely notifications/alerts regarding vehicle usage-based pricing corresponding to a trip. In example embodiments, a notification/alert of regarding vehicle usage-based pricing corresponding to a trip may be provided to a user before a trip has begun, at the beginning of a trip, during a trip, prior to completion of the trip, and/or the like.

In example embodiments, user action may trigger a request for usage-based trip cost determination. For example, a user may request a usage-based cost trip determination, a request may be automatically triggered when a user starts driving a vehicle or requests a navigational route. One or more cost model parameters may be determined corresponding to the trip based on the request and provided to a marketplace system. The marketplace system may be configured to calculate one or more trip cost determinations based on one or more cost model parameters and/or provide one or more cost model parameters to a provider system configured to calculate a trip cost determination. The trip cost determination and/or a representation thereof may then be presented to the user (e.g., by a user apparatus).

In some embodiments, if the actual trip deviates from the expected trip by more than a threshold amount and/or the actual trip is modified from the original trip for which the trip cost determination was determined, a modified trip cost determination may be determined and presented to the user.

FIG. 1 provides an illustration of an example system that can be used in conjunction with various embodiments of the present invention. As shown in FIG. 1, the system may include one or more user apparatus 20, one or more broker apparatus 10, one or more marketplace apparatus 40, one or more networks 50, and/or the like. In various embodiments, the user apparatus 20 may be an in vehicle navigation system, a mobile computing device, and/or the like. For example, a user apparatus 20 may be an in vehicle navigation system mounted within and/or be onboard a vehicle such as a motor vehicle, non-motor vehicle car, scooter, truck, van bus, motorcycle, bicycle, Segway, golf cart, and/or the like. In various embodiments, the user apparatus 20 may be a smartphone, tablet, personal digital assistant (PDA), and/or other mobile computing device.

In example embodiments, a broker apparatus 10 may comprise components similar to those shown in the example broker apparatus 10 diagrammed in FIG. 2. For example, the broker apparatus 10 may comprise a processor 12, memory 14, a user interface 18, a communications interface 16, and/or other components configured to perform various operations, procedures, functions or the like described herein. Example embodiments of the broker apparatus 10 are described in more detail below with respect to FIG. 2.

In example embodiments, a user apparatus 20 and/or a marketplace system 40 may also comprise components similar to those shown in the example broker apparatus 10 diagrammed in FIG. 2. For example, a user apparatus 20 may comprise a processor, memory, a user interface, a communications interface, and/or other components configured to perform various operations procedures, functions or the like described herein. Additionally, the user apparatus 20 may comprise one or more sensors. For example, the user apparatus 20 may further comprise a location sensor (e.g., GPS sensor) and/or the like. Similarly, a marketplace system 40 may comprise a processor, memory, a user interface, a communications interface, and/or other components configured to perform various operations procedures, functions or the like described herein.

In various embodiments, the broker apparatus 10 and/or marketplace system 40 may be located remotely from the user apparatus 20. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), cellular network, and/or the like. For example, a user apparatus 20 may be in communication with a broker apparatus 10 and/or marketplace system 40 via the network 50. For example, the user apparatus 20 may communicate with the broker apparatus 10 via the Cloud. In some embodiments, the user apparatus 20 may communicate with the broker apparatus 10 and/or marketplace system 40 through the automotive cloud, digital transportation infrastructure (DTI), radio data system (RDS)/high definition radio (HD) or other digital radio system, and/or the like.

II. Exemplary Operation

In example embodiments, user action may trigger a request for a trip cost determination to be provided (e.g., transmitted via a network) to a broker apparatus 10. The broker apparatus 10 may determine and/or identify one or more cost model parameters. For example, the cost model parameters may comprise current and/or predicted real-word conditions (e.g., weather, driving, and/or traffic conditions) at the user's current location and/or one or more locations along a route the user is expected to travel along. In example embodiments, the cost model parameters may comprise user behavior characteristics, vehicle characteristics, roadway information/data, a route the user is expected to travel along, and/or the like. The broker apparatus 20 may then provide one or more cost model parameters to the marketplace system 40. The marketplace system 40 may determine and/or compute one or more trip cost determinations based on one or more provider pricing models and provide the one or more trip cost determinations to the broker apparatus 10. The broker apparatus 10 may then return one or more trip cost determinations to the user apparatus 20 and cause the user apparatus 20 to present a trip cost determination and/or a representation thereof through a user interface of the user apparatus 20.

FIG. 3 provides a flowchart illustrating operations performed, such as by the broker apparatus 10, in order to present a trip cost representation to a user, in accordance with an example embodiment, and FIGS. 4 and 4A provide schematic information flow diagrams for example embodiments of the present invention for presenting a trip cost representation to a user. Starting at block 202 of FIG. 3, a pricing request 100 is received. For example, the broker apparatus 10 may receive a pricing request 100, as shown in FIGS. 4 and 4A. For example, the broker apparatus 10 may comprise means, such as processor 12, communications interface 16, and/or the like, for receiving a pricing request 100. In example embodiments, the user apparatus 20 may generate and provide a pricing request 100 (e.g., via a processor and/or communications interface thereof) that is then received by the broker apparatus 10.

In example embodiments, various user actions that are detected and/or measured by one or more sensors comprising and/or in communication with the user apparatus 20 and/or user provided inputs received through a user interface of the user apparatus 20 may trigger the user apparatus 20 to generate and provide a pricing request 100, as shown by arrow 412. For example, a user may access an application operating on the user apparatus 20, provide information/data regarding a possible upcoming trip, and request a trip cost determination for the possible upcoming trip. For example, the user may be planning a road trip and want to know what the usage-based costs for the trip will be and how the usage-based costs for the trip may vary if they leave at 5 am on Tuesday, 2 pm on Tuesday, 10 am on Wednesday, and/or the like. Thus, the user (e.g., operating the user apparatus 20) requesting a trip cost determination may trigger a pricing request 100 to be generated and provided by the user apparatus 20. In another example, a user may provide input through a user interface of the user apparatus 20 indicating a destination and request a route from the user's location (or other location) to the destination. Receiving the user input requesting a route may trigger the user apparatus 20 to generate and provide a pricing request 100. In yet another example, a user may start driving a vehicle. One or more sensors of the user apparatus 20 and/or in communication with the user apparatus 20 (e.g., a location sensor, accelerometer(s), vehicle engine sensor(s), and/or the like) may determine that the user is driving the vehicle (e.g., a trip has started) and trigger the user apparatus 20 to generate and provide a pricing request 100. As mentioned above, the pricing request 100 may be generated and provided before the start of a trip (e.g., in the planning stages of a trip), at the beginning of a trip (e.g., when the user requests a route for the trip, during the first 2 or 5 minutes of a trip, and/or the like), during a trip (e.g., when it is determined that a user is driving a vehicle or when a trip is modified, and/or the like).

In example embodiments, a pricing request 100 may comprise various information/data relevant to a trip. In example embodiments, the pricing request 100 may identify the user. For example, the pricing request 100 may comprise a user identifier configured to uniquely identify the user. For example, the pricing request 100 may comprise a user number, a driver or operator's license number associated with the user, a user profile name, and/or the like. In example embodiments, the pricing request 100 may comprise a vehicle identifier configured to either uniquely identify the vehicle (e.g., a vehicle identification number (VIN), registration number, plate number, and/or the like), identify the type of vehicle (e.g., make, model, year, trim package, and/or the like), or identify the class of vehicle (e.g., pick-up truck, sport utility vehicle, compact sedan, full size sedan, station wagon, motorcycle, and/or the like). In example embodiments, the pricing request 100 comprises a user location. For example, a location sensor of the user apparatus may determine a user location (e.g., a latitude and longitude, street address, geocode, and/or the like) indicating the real-time physical location of the user apparatus 20 and/or the user. In example embodiments, the pricing request 100 may comprise one or more routes. For example, the user may provide (e.g., via a user interface of the user apparatus 20) input indicating a destination location and/or a starting location (e.g., the user location or another location) and the user apparatus 20 may determine one or more routes from navigating from the starting location to the destination location. In some embodiments, one or more routes determined by the user apparatus 20 and/or information/data related thereto are included in the pricing request 100. In example embodiments, the pricing request 100 may comprise a departure time. For example, if the user is planning a trip, the user may provide input via the user interface of the user apparatus 20 indicating a proposed or planned departure time. If the pricing request 100 is triggered by the user requesting a route and/or starting to drive, the pricing request 100 may comprise an indication that the trip is starting now, is currently in progress, and/or the like. In example embodiments, the pricing request 100 may comprise planned or expected stop information/data. For example, the user apparatus 20 may receive user input indicating the user would like to stop at a particular gas station, rest stop, restaurant and/or the like. In another example, the user apparatus 20 may have learned (e.g., through machine learning, and/or the like) that the user likes to stop at a particular gas station, rest stop, restaurant, and/or the like and that the stop usually takes a certain amount of time and/or a certain range of time. For example, the user apparatus 20 may identify that the user likes to stop at Fries R Us and such a stop usually takes 5-10 minutes. Thus, the pricing request 100 may comprise planned and/or expected stop information/data. In some embodiments, the pricing request 100 may not comprise planned and/or expected stop information/data but the user apparatus 20 may incorporate planned and/or expected stop information/data into determining the one or more routes.

After the pricing request 100 is received at block 202, and/or in response thereto, one or more cost model parameters may be determined, for example, by the broker apparatus 10. For example, at block 204, real-world conditions information/data 105 may be determined. The real-world conditions information/data 105 may comprise real time, near real time, current and/or predicted conditions. For example, the real-world conditions information/data 105 may comprise information/data related to weather conditions, driving conditions, traffic conditions, and/or the like. For example, the real-world conditions information/data 105 may comprise information/data related to traffic congestion, construction site locations, traffic incidents, environmental conditions, area climate, sun angle, time-of-year, fog and/or precipitation, and/or the like. In example embodiments, real-world conditions information/data 105 may be determined based on current traffic probe information/data, DTI component information/data, current weather station information/data, current traffic system information/data, media traffic and/or weather reports, and/or the like. In example embodiments, real-world conditions information/data 105 may be based on models, predictions, and/or the like based on current traffic probe information/data, DTI component information/data, current weather station information/data, current traffic system information/data, media traffic and/or weather reports, historical weather and/or traffic information/data, and/or the like. In example embodiments, the real-world conditions information/data 105 may be determined for the user location (e.g., the user location provided in the pricing request 100), and/or one or more locations along, near, and/or in the vicinity of a route provided in the pricing request 100. For example, in one embodiment, the current real-world conditions information/data 105 may be determined for the user location and predicted real-world conditions information/data 105 may be determined for locations along a route (e.g., every two, five, ten, etc. kilometers along the route). The predicted real-world conditions information/data 105 may correspond to the time at which it is expected the user will be at, near, and/or in the vicinity of that location along the route. For example, the broker apparatus 10 may determine real-world conditions information/data 105. For example, the broker apparatus 10 may comprise means, such as processor 12, communications interface 16, and/or the like, for determining real-world conditions information/data 105.

At block 206, user behavior characteristics 115 are determined. For example, information/data regarding a user's driving habits and/or historical user driving information/data may be used to determine user behavior characteristics 115. For example, the user behavior characteristics 115 may describe and/or classify how a user behaves under different conditions, compare user behavior to an average driver's behavior, and/or the like. For example, the user behavior characteristics 115 may comprise a set of metrics that describe a user's driving habits and/or behaviors in comparison to other drivers on the road. In various embodiments, the user behavior characteristics 115 may depend on context (e.g., is the user driving in parking lot or on the highway; is it raining, snowing, or sunny; is it daytime or nighttime; and/or the like) and may describe and/or classify the user's driving behavior in various situations. For example, the user behavior characteristics 115 may comprise a driver score or classification. For example, the user behavior characteristics may comprise a snow driving score, a rain driving score, a normal highway condition driving score, and/or the like, each indicating how a user may drove in a particular context. In example, embodiments, the driver behavior characteristics may be determined for the user identified by the user identifier of the pricing request 100. For example, the broker apparatus 10 may determine driver behavior characteristics. For example, the broker apparatus 10 may comprise means, such as the processor 12, communications interface 16, and/or the like, for determining driver behavior characteristics.

In some embodiments, the user behavior characteristics 115 may be determined in response to receiving a pricing request 100. In other embodiments, the user behavior characteristics 115 may be predetermined and stored by the broker apparatus 10 and/or the user apparatus 20. In some embodiments in which the user behavior characteristics 115 may be predetermined and stored, the user behavior characteristics 115 may be allowed to evolve and/or change over time based on frequent, regular, periodic, and/or the like updates. For example, the user behavior characteristics 115 may evolve and/or change over time based on machine learning of driver behaviors, re-evaluation of driver behavior data (e.g., including recent and/or previously un-evaluated driver behavior data), and/or the like.

At block 208, relevant roadway information/data 110 may be determined and/or identified. For example, the broker apparatus 10 may determine and/or identify relevant roadway information/data 110. For example, the broker apparatus 10 may comprise means, such as the processor 12 and/or the like, for identifying relevant roadway information/data 110. For example, the broker apparatus 10 may store (e.g., in memory 14) and/or otherwise have access to a geographic database and/or the like comprising map information/data. The relevant roadway information/data 110 may be determined or identified from the map information/data. In example embodiments, the relevant roadway information/data 110 is roadway information/data 110 corresponding to the user location and/or a route included in the pricing request 100. In various embodiments, the roadway information/data 110 may comprise information/data regarding the topology and/or geometry of one or more roads, information/data regarding road types (e.g., divided highway, four lane highway, two lane surface street, and/or the like) and/or other information/data regarding one or more roadways the user is currently traveling on and/or will travel along on a route provided in the pricing request 100.

At block 210, vehicle characteristics 120 may be determined and/or identified. For example, the broker apparatus 10 may determine and/or identify vehicle characteristics 120 for the particular vehicle, vehicle type, and/or vehicle classification identified in the pricing request 100. For example, the broker apparatus 10 may comprise means, such as the processor 12 and/or the like, for determining and/or identifying vehicle characteristics 120 for the particular vehicle, vehicle, type, and/or vehicle classification identified in the pricing request 100. For example, the vehicle characteristics 120 may comprise handling information/data for the particular vehicle, vehicle type, and/or vehicle classification identified in the pricing request 100. For example, the vehicle characteristics 120 may comprise information/data regarding the steering, braking, engine size, powertrain (e.g., automatic, manual, rear wheel drive, front wheel drive, all-wheel drive, self-locking/activating four wheel drive, and/or the like), towing capacity, acceleration, smart features (e.g., accident avoidance, cruise control, lane departure warning, self-driving, etc.), safety ratings, and/or the like of the particular vehicle, vehicle type, and/or vehicle classification identified in the pricing requirement.

In example embodiments, other cost model parameters may be determined or identified by the broker apparatus 10 in place of and/or in addition to the real-world conditions information/data 105, user behavior characteristics 115, roadway information/data 110, and/or vehicle characteristics 120. In some embodiments, the broker apparatus 10 may determine and/or identify only one, two, or three of the cost model parameters. In some embodiments, the user apparatus 20 may determine and/or identify one or more of the cost model parameters. For example, in one embodiment, the user apparatus 20 may determine the user behavior characteristics 115.

At block 212, the cost model information/data may be provided. For example, the broker apparatus 10 may provide the cost model information/data. For example, the broker apparatus 10 may comprise means, such as the processor 12, communications interface 16, and/or the like, for providing the cost model information/data. For example, the cost model information/data may comprise one or more cost model parameters, one or more routes, and/or the like. For example, the cost model information/data may be transmitted to a marketplace system 40 (e.g., through a wired or wireless network 50), as indicated by arrow 412. As shown in FIG. 4A, in an example embodiment, the user apparatus 20 may determine and/or store the user behavior characteristics 115 and provide the user behavior characteristics 115 to the marketplace system through a wireless network, as indicated by arrow 406.

The marketplace system 40 may then determine/compute one or more pricing models 125 (e.g., 125A, 125B, 125C, . . . , 125N) based on the cost model information/data and/or provide at least a portion of the cost model information/data to one or more provider systems to determination/computation of one or more pricing models. For example, one or more providers may provide the marketplace system 40 with one or more pricing models 125 (e.g., 125A, 125B, 125C, . . . , 125N). In various embodiments, the one or more providers may be a government agency or affiliate charged with collecting vehicle usage-based taxes, roadway usage fees, dynamically varying and/or set tolls, and/or the like; an insurance provider offering usage-based vehicle insurance; a fleet management company providing usage-based vehicle rentals/shares, and/or the like. The marketplace system 40 may thus determine/compute one or more pricing models 125 (e.g., 125A, 125B, 125C, . . . , 125N) to determine one or more trip cost determinations 130. The trip cost determination may relate to the cost for the trip due to vehicle usage-based taxes, roadway usage fees, tolls (including dynamically varying tolls and set tolls), usage-based vehicle insurance, usage-based vehicle rental/share fees, and/or the like. The marketplace system 40 may provide the one or more trip cost determinations 130. For example, the marketplace system 40 may transmit the one or more trip cost determinations 130 to the broker apparatus 10 (e.g., via a wired or wireless network 50), as shown by arrow 414.

Continuing with FIG. 3, at block 214, the one or more trip cost determinations 130 are received. For example, the broker apparatus 10 may receive the one or more trip cost determinations 130. For example, the broker apparatus 10 may comprise means, such as processor 12, communications interface 16, and/or the like, for receiving the one or more trip cost determinations 130. In example embodiments, the broker apparatus 10 may determine a trip cost representation configured to quickly and easily indicate to a user a range or category representative of the trip cost determination 130.

At block 216, at least one of the one or more trip cost determinations 130, and/or a representation thereof, are provided (e.g., to the user apparatus 20 through a wireless network 50) and caused to be presented to the user (e.g., through user interface of the user apparatus 20). For example, the broker apparatus 10 may provide at least one of the one or more trip cost determinations 130, and/or a representation thereof, and cause the at least one of the one or more trip cost determinations 130 and/or a representation thereof to be presented to the user, as shown by arrow 416 in FIGS. 4 and 4A. For example, the broker apparatus 10 may comprise means, such as the processor 12, communications interface 16, and/or the like, for providing at least one of the one or more trip cost determinations 130, and/or a representation thereof, and causing the at least one of the one or more trip cost determinations 130 and/or a representation thereof to be presented to the user. For example, the trip cost representation 5 may be a representation of the trip cost determination 130. For example, the trip cost representation 5 may be a graphic indicator of the trip cost determination 130 configured to be displayed by a user interface of the user apparatus 20, a text/numerical indicator of the trip cost determination 130 configured to be displayed and/or provided as audio output by a user interface of the user apparatus 20, an audible indicator of the trip cost determination 130 configured to be presented as audio output by a user interface of the user apparatus 20, a haptic indicator of the trip cost determination 130 configured to be presented by a user interface of the user apparatus 20, and/or the like.

FIGS. 5A, 5B, 5C, and 5D show some example graphical trip cost representations 5 (e.g., 5A, 5B, 5C, and 5D). For example, a trip cost determination 130 may be categorized into one of a predetermined number of categories. For example, a trip cost determination 130 may be categorized into one of three categories. Some embodiments may categorize a trip cost determination 130 into more or less than three categories. In an example embodiment, the categories may comprise a green category 3, a yellow category 2, and a red category 1. For example, the green category 3 may indicate that conditions are normal and standard rates apply, the yellow category 2 may indicate that conditions are challenging and rates are increased, and the red category may indicate that conditions are unsafe and a premium will be charged. In another example embodiment, the green category 3 may indicate that trip cost determination is low, the yellow category 2 may indicate that the trip cost determination is mid-level, and the red category 1 may indicate that the trip cost determination is high. For example, a first threshold dollar amount may indicate the separation between the green category 3 and the yellow category 2 and a second threshold dollar amount may indicate the separation between the yellow category 2 and the red category 1. The user may be able to set the first and second thresholds (e.g., provide input to a user interface of the user apparatus providing an indication of the first and second threshold amounts) and such thresholds may be stored as part of user preferences associated with the user. For example, the user may set the first and second thresholds such that a trip cost determination 130 categorized into the green category 1 indicates an affordable trip, a trip cost determination 130 categorized into the yellow category 2 indicates a trip that should only be undertaken if necessary, and a trip cost determination 130 categorized into the red category 3 indicates a trip that is cost prohibitive and/or unaffordable to the user. As such, the trip cost representation 5 may easily and quickly provide the user with information regarding the cost of the trip (e.g., cost of vehicle usage-based taxes, roadway usage fees, tolls (including dynamically varying tolls and/or set tolls), usage-based vehicle insurance, usage-based vehicle rental/share fees, and/or the like for the trip) before, at the beginning of, and/or during the trip.

FIG. 5A shows a traffic light trip cost representation 5A, wherein either the red, yellow, or green light may be "on" to indicate whether the trip cost determination 130 was categorized into the red category 1, yellow category 2, or green category 3. FIG. 5B shows a meter trip cost representation 5B, wherein an arrow or dial may indicate whether the trip cost determination 130 was categorized into the red category 1, yellow category 2, or green category 3. FIG. 5C shows a set of circle trip cost representations 5C, wherein the red circle may be shown to indicate the trip cost determination 130 was categorized into the red category 1, the yellow circle may be shown to indicate the trip cost determination 130 was categorized into the yellow category 2, or the green circle may be shown to indicate the trip cost determination 130 was categorized into the green category 3. FIG. 5D shows a set of warning hand trip cost representations 5D wherein the red stop hand may be shown to indicate the trip cost determination 130 was categorized into the red category 1, the yellow caution hand may be shown to indicate the trip cost determination 130 was categorized into the yellow category 2, or the green thumbs up hand may be shown to indicate the trip cost determination 130 was categorized into the green category 3.

It should be understood that a variety of graphic, audible, and/or haptic trip cost representations 5 may be used in the spirit of the present invention. Moreover, a variety of trip cost categories may be user or system defined to provide the user with a representation of a trip cost determination 130. In various embodiments, the type of trip cost representation 5 (e.g., graphic, audible, or haptic) and the particular graphic, sound, and/or haptic alert used to present the trip cost representation 5 to the user may be selected by a user (e.g., through input to a user interface of the user apparatus 20) and stored (e.g., in memory 14 and/or memory of the user apparatus 20) in association with the user preferences associated with the user. In various embodiments, the user preferences may further comprise a user identifier, information identifying the specific vehicle, type of vehicle, or vehicle classification that the user drives and/or prefers to drive, and/or the like.

As noted above, in example embodiments more than one trip cost representation 5 may be presented to the user (e.g., by a user interface of the user apparatus 20). For example, trip cost determinations 130 from multiple providers may be provided. For example, multiple vehicle rental providers and/or vehicle share providers may each provide a trip cost determination 130. In another example, trip cost determinations 130 for multiple routes may be provided. For example, FIG. 5E shows an example situation in which a user has requested a route and has been provided with three route options (e.g., routes 101, 102, and 103). The trip cost determinations for routes 101 and 103 have been categorized in the green category 3 and the trip cost determination for route 102 has been categorized in the yellow category 2. For example, routes 101 and 103 may be free of tolls and route 102 may include a high occupancy toll lane with a dynamically varying toll. The trip cost representation 5 for route 102 shows that the user would pay a significant toll for traveling in the high occupancy toll lane if the user selected route 102. The illustrated map, routes 101, 102, 103 and their associated information and trip cost representations 5 may be presented to the user by a user interface of the user apparatus 20. In example embodiments, the user may provide input through the user interface of the user apparatus 20 to select a route the user will follow for the trip. In another embodiment, the user may simply start driving one of the routes and the user apparatus 20 may determine which route the user selected based on location information provided by a location sensor of the user apparatus 20.

In example embodiments, the trip cost determination 130 may be binding. For example, the trip cost determination 130 may be the cost the user will pay for the trip (e.g., the usage-based tax, toll, insurance, and/or rental/share fees for the trip) as long as the actual trip does not deviate significantly from the expected trip. For example, if the user makes a stop at a gas station, restaurant, rest stop or the like which then causes the user to be driving in inclement weather, rush hour traffic, and/or the like, or causes the user to avoid driving in inclement weather, rush hour traffic, and/or the like, or otherwise significantly delays the user, a modified trip cost determination may be determined and a representation thereof may be presented to the user.

FIG. 6 provides a flowchart illustrating operations performed, such as by the broker apparatus 10, in order to provide a user with a representation of a modified trip cost determination. At block 302, a modified trip request may be received. For example, the broker apparatus 10 may receive a modified trip request. For example, the broker apparatus 10 may comprise means, such as processer 12, communications interface 16, and/or the like, for receiving a modified trip request. For example, the user apparatus 20 may determine that the actual trip is varying from the expected trip upon which the original trip cost determination 130 was based by more than a threshold amount. For example, the user apparatus 20 may determine that the user is ten, twenty, thirty, or the like minutes behind where the user was expected to be at a particular point in the trip. In another example, the user apparatus 20 may determine that the user is taking a different route from the expected route. In an example embodiment, it may be determined that the user ended up renting/sharing a different type or classification of vehicle than planned. The user apparatus 20 may then generate and provide a modified trip request. For example, the user apparatus 20 may transmit a modified trip request to the broker apparatus 10. However, in other embodiments, the broker apparatus 10 may determine (e.g., based on received user location information/data) that the actual trip is varying from the expected trip by more than a threshold amount and may generate the modified trip request. In an example embodiment, the modified trip request may comprise at least one of a modified route, modified timing information/data, a modified vehicle identifier, and/or the like.

In example embodiments, the modified trip request may comprise information/data similar to the pricing request 100 (e.g., a current user location). Additionally, the modified trip request may comprise information/data identifying the trip cost determination 130 and/or the trip. The modified trip request may further comprise information/data related to the part of the actual trip that has already been completed and/or information/data related to the part of the trip that is still yet to be completed.

At block 304, after and/or in response to receiving the modified trip request, one or more modified cost model parameters are determined/identified. For example, the broker apparatus 10 may determine and/or identify one or more modified cost model parameters. For example, the broker apparatus 10 may comprise means, such as the processor 12, communications interface 16, and/or the like, for determining and/or identifying one or more modified cost model parameters. For example, modified real-world conditions information/data, user behavior characteristics, vehicle behavior characteristics, roadway information/data, and/or the like may be determined and/or identified in a manner similar to that described above.

At block 306, modified trip information/data comprising at least one of the one or more modified cost model parameters is provided. For example, the broker apparatus 10 may provide modified trip information/data comprising at least one of the one or more modified cost model parameters.

For example, the broker apparatus 10 may comprise means, such as processor 12, communications interface 16, and/or the like for providing modified trip information/data comprising at least one of the one or more modified cost model parameters. For example, the broker apparatus 10 may transmit at least one of the one or more modified cost model parameters to the marketplace system 40 through a wired or wireless network 50. The marketplace system 40 may then determine and/or compute one or more modified trip cost determinations based at least in part on the at least one of the one or more modified cost model parameters. For example, the marketplace system 40 may determine and/or compute one or more modified trip cost determinations using one or more provider pricing models 125, similar to as described above. In some embodiments, multiple trip cost determinations may have been determined in response to the pricing request (e.g., providing multiple vehicle rental options) but only one modified trip cost determination is provided (e.g., because the user has already committed to a particular vehicle rental option). The marketplace system 40 may then provide the one or more modified trip cost determinations. For example, the marketplace system 40 may transmit the one or more modified trip cost determinations to the broker apparatus 10 through one or more wired or wireless networks 50.

At block 308, the one or more modified trip cost determinations is received. For example, the broker apparatus 10 may receive the one or more modified trip cost determinations. For example, the broker apparatus 10 may comprise means, such as processor 12, communications interface 16, and/or the like, for receiving the one or more modified trip cost determinations. At block 310 the one or more modified trip cost determinations and/or a representation thereof may be provided. For example, the broker apparatus 10 may provide at least one of the one or more modified trip cost determinations. For example, the broker apparatus 10 may comprise means, such as processor 12, communications interface 16, and/or the like, for providing at least one of the one or more modified trip cost determinations and/or a representation thereof. For example, the broker apparatus 10 may transmit at least one of the one or more modified trip cost determinations and/or a representation thereof to the user apparatus 20 via a wireless network (e.g., the automotive cloud, DTI, RDS/HD, and/or the like.

At block 312, it may be determined if the modified trip cost representation is different than the trip cost representation 5. For example, the user apparatus 20 and/or the broker apparatus 10 may determine if the modified trip cost representation is different than the trip costs representation 5 and/or if the modified trip cost determination varies more than a threshold amount from the trip cost determination 130. In example embodiments, it may be determined if the modified trip cost representation is different than the trip cost representation 5. For example, the user apparatus 20 and/or the broker apparatus 10 may determine if the modified trip cost representation is different than the trip cost representation 5 and/or if the modified trip cost determination varies more than a threshold amount from the trip cost determination 130 based on stored user preferences associated with the user. For example, the user apparatus 20 and/or the broker apparatus 10 may comprise means, such as a processor (e.g., processor 12) or the like, for determining if the modified trip cost representation is different than the trip costs representation 5 and/or if the modified trip cost determination varies more than a threshold amount from the trip cost determination 130. In example embodiments wherein the broker apparatus 10 determines if the modified trip cost representation is different than the trip costs representation 5 and/or if the modified trip cost determination varies more than a threshold amount from the trip cost determination 130, block 312 may be performed before block 310.

If it is determined that the modified trip cost representation is not different than the trip cost representation 5 and/or that the modified trip cost determination does not vary more than a threshold amount from the trip cost determination 130, then the process ends. If it is determined that the modified trip cost representation is different than the trip cost representation 5 and/or that the modified trip cost determination does vary more than a threshold amount from the trip cost determination 130, then the process continues to block 314. At block 314, the broker apparatus 10 may cause the at least one of the one or more modified trip cost determinations and/or a representation thereof to be presented to the user (e.g., through a user interface of the user apparatus 20). For example, a graphic, audio, and/or haptic modified trip cost representation may be presented to the user in accordance with stored user preferences associated with the user. In example embodiments, the modified trip cost representation may be presented to the user in a manner similar to that described above with respect to the trip cost representation 5.

As usage-based taxes, tolls, fees, and/or the like become more widespread, it will become increasingly more important to provide a user with an indication of a trip cost associated with the usage-based taxes, tolls, fees, and/or the like. Embodiments of the present invention provide the user with a representation of a trip cost that may be quickly and easily understood such that if the user is driving, the user will not be distracted from driving and/or if the user has not yet committed to the trip or the timing thereof, the user may adjust when the trip is made in order to reduce the cost of the trip. For example, a representation of a trip cost may be presented to a user (e.g., through a user interface of a user apparatus 20) when a trip is being planned, before a trip has started, at the beginning of a trip (e.g., in the first few minutes of the trip), during a trip, and/or if the cost of the trip has changed due to the actual trip being different from the planned/expected trip.

III. Example Apparatus

The user apparatus 20, broker apparatus 10, and/or marketplace system 40 of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a personal digital assistant (PDA), a watch, a camera, a computer, a server, and/or other device that can perform navigation-related functions, such as digital routing and map display. Additionally or alternatively, the apparatus may be embodied in other types of computing devices, such as a server, a personal computer, a computer workstation, a laptop computer, a plurality of networked computing devices or the like, that are configured to analyze probe points for route planning, determine/identify cost model parameters, determine/compute a pricing model based on cost model parameters, or other purposes. In this regard, FIG. 2 depicts a broker apparatus 10 of an example embodiment that may be embodied by various computing devices including those identified above. In example embodiments, a user apparatus 20 and/or a marketplace system 40 may comprise similar components as the illustrated example broker apparatus 10. As shown, the broker apparatus 10 of an example embodiment may include, may be associated with or may otherwise be in communication with a processor 12 and a memory device 14 and optionally a communication interface 16 and/or a user interface 18. For example, the user apparatus 20 and/or marketplace system 40 may also each comprise a processor, memory, communication interface, and/or user interface.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the broker apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the broker apparatus 10 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14 and/or the like).

The broker apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the broker apparatus 10 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3 and 6 illustrate flowcharts of broker apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a pricing request corresponding to a particular trip, the particular trip corresponding to an origin location, a destination location, and a departure time, wherein the pricing request was generated by a user apparatus;
determining one or more cost model parameters for the particular trip, the one or more cost model parameters comprising at least one of (a) current real-world conditions or predicted real-world conditions based on the departure time, (b) user behavior characteristics, (c) vehicle characteristics, or (d) roadway information for the particular trip;
providing cost model information comprising at least one of (a) the one or more cost model parameters for the particular trip or (b) a route from the origin location to the destination location, wherein the cost model information is provided such that a marketplace system receives the cost model information;
receiving a trip cost determination for the particular trip, the trip cost determination determined based at least in part on the cost model information for the particular trip, wherein the trip cost determination was generated by the marketplace system; and
providing the trip cost determination for the particular trip such that the trip cost determination is received by the user apparatus, wherein processing of the trip cost determination by the user apparatus causes a user interface of the user apparatus to present a representation of the trip cost determination that graphically indicates a category associated with the trip cost determination for the particular trip.

2. The method according to claim 1, wherein the current real-world conditions comprise at least one of current weather conditions, current traffic conditions, or current driving conditions in the vicinity of the user location, and wherein the predicted real-world conditions comprise at least one of predicted weather conditions, predicted traffic conditions, or predicted driving conditions at one or more locations along the route.

3. The method according to claim 1, wherein the user behavior characteristics comprise a driver score or driver classification for a user associated with the request.

4. The method according to claim 1, wherein the vehicle characteristics comprise vehicle handling information for a particular vehicle, a vehicle type, or a vehicle classification associated with the request.

5. The method according to claim 1, wherein the roadway information comprises map information for one or more roads corresponding to the user location, the route, or both.

6. The method according to claim 1, wherein the route comprises a navigation path for driving from the origin location to the destination location.

7. The method according to claim 1, wherein the user location is the current location of the user as determined by a location sensor of the user apparatus.

8. The method according to claim 1, wherein the trip cost determination comprises a cost for the particular trip associated with the user location and wherein the cost is incurred for roadway usage taxes or fees, tolls, usage-based vehicle insurance, vehicle rental fees, or vehicle share fees.

9. The method according to claim 1, presenting the representation of the trip cost determination through the user interface comprises determining the representation of the trip cost determination based on stored user preferences.

10. The method according to claim 1 further comprising:
receiving a modified trip request, the modified trip request comprising a modified route, modified timing information, a modified vehicle identifier, or a combination thereof;
determining one or more modified cost model parameters based at least in part on the modified trip request;
providing at least one of the one or more modified cost model parameters;
receiving a modified trip cost determination; and
providing the modified trip cost determination.

11. The method according to claim 10, further comprising, when it is determined that a modified representation of the modified trip cost determination is different than the representation of the trip cost determination, causing presentation of the modified representation of the trip cost determination through the user interface of the user apparatus.

12. An apparatus comprising at least one processor and at least one non-transitory memory storing computer program code, the at least one memory and the computer program code configured to, with the processor, cause the apparatus to at least:
receive a pricing request corresponding to a particular trip, the particular trip corresponding to an origin location, a destination location, and a departure time, wherein the pricing request was generated by a user apparatus;
determine one or more cost model parameters for the particular trip, the one or more cost model parameters comprising at least one of (a) current real-world conditions or predicted real-world conditions based on the departure time, (b) user behavior characteristics, (c) vehicle characteristics, or (d) roadway information for the particular trip;
provide cost model information comprising at least one of (a) the one or more cost model parameters for the particular trip or (b) a route from the origin location to the destination location, wherein the cost model information is provided such that a marketplace system receives the cost model information;
receive a trip cost determination for the particular trip, the trip cost determination determined based at least in part on the cost model information for the particular trip, wherein the trip cost determination was generated by the marketplace system; and
provide the trip cost determination for the particular trip such that the trip cost determination is received by the user apparatus, wherein processing of the trip cost determination by the user apparatus causes a user interface of the user apparatus to present a representation of the trip cost determination that graphically indicates a category associated with the trip cost determination for the particular trip.

13. The apparatus according to claim 12, wherein the current real-world conditions comprise at least one of current weather conditions, current traffic conditions, or current driving conditions in the vicinity of the user location, and wherein the predicted real-world conditions comprise at least one of predicted weather conditions, predicted traffic conditions, or predicted driving conditions at one or more locations along the route.

14. The apparatus according to claim 12, wherein the user behavior characteristics comprise a driver score or driver classification for a user associated with the request.

15. The apparatus according to claim 12, wherein the vehicle characteristics comprise vehicle handling information for a particular vehicle, a vehicle type, or a vehicle classification associated with the request.

16. The apparatus according to claim 12, wherein the roadway information comprises map information for one or more roads corresponding to the user location, the route, or both.

17. The apparatus according to claim 12, wherein the trip cost determination comprises a cost for the particular trip associated with the user location and wherein the cost is incurred for roadway usage taxes or fees, tolls, usage-based vehicle insurance, vehicle rental fees, or vehicle share fees.

18. The apparatus according to claim 12, wherein the at least one memory and the computer program code are further configured to, with the processor, cause the apparatus to at least:
receive a modified trip request, the modified trip request comprising a modified route, modified timing information, a modified vehicle identifier, or a combination thereof;
determine one or more modified cost model parameters based at least in part on the modified trip request;
provide at least one of the one or more modified cost model parameters;
receive a modified trip cost determination; and
provide the modified trip cost determination.

19. The apparatus according to claim 18, wherein the at least one memory and the computer program code are further configured to, with the processor, cause the apparatus to at least, when it is determined that a modified representation of the modified trip cost determination is different than the representation of the trip cost determination, causing presentation of the modified representation of the trip cost determination through the user interface of the user apparatus.

20. A computer program product comprising at least one non-transitory computer-readable storage medium having computer-executable program code instructions stored therein, the computer-executable program code instructions comprising program code instructions configured to, when executed by a processor, cause the processor to:

receive a pricing request corresponding to a particular trip, the particular trip corresponding to an origin location, a destination location, and a departure time, wherein the pricing request was generated by a user apparatus;

determine one or more cost model parameters for the particular trip, the one or more cost model parameters comprising at least one of (a) current real-world conditions or predicted real-world conditions based on the departure time, (b) user behavior characteristics, (c) vehicle characteristics, or (d) roadway information for the particular trip;

provide cost model information, comprising at least one of (a) the one or more cost model parameters for the particular trip or (b) a route from the origin location to the destination location wherein the cost model information is provided such that a marketplace system receives the cost model information;

receive a trip cost determination for the particular trip, the trip cost determination determined based at least in part on the cost model information for the particular trip, wherein the trip cost determination was generated by the marketplace system; and provide the trip cost determination for the particular trip such that the trip cost determination is received by the user apparatus, wherein processing of the trip cost determination by the user apparatus causes a user interface of the user apparatus to present a representation of the trip cost determination that graphically indicates a category associated with the trip cost determination for the particular trip.

* * * * *